US012589578B2

(12) United States Patent
Stadermann et al.

(10) Patent No.: US 12,589,578 B2
(45) Date of Patent: Mar. 31, 2026

(54) ULTRATHIN GRAPHENE/POLYMER LAMINATE FILMS

(71) Applicant: Lawrence Livermore National Security, LLC, Livermore, CA (US)

(72) Inventors: Michael Stadermann, Pleasanton, CA (US); Patrick Campbell, Oakland, CA (US); Philip E. Miller, Livermore, CA (US); Chantel Aracne-Ruddle, Livermore, CA (US); Sung Ho Kim, Livermore, CA (US); Francisco J. Espinosa-Loza, Bellevue, WA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 301 days.

(21) Appl. No.: 17/518,410

(22) Filed: Nov. 3, 2021

(65) Prior Publication Data

US 2022/0055356 A1    Feb. 24, 2022

Related U.S. Application Data

(63) Continuation of application No. 15/698,473, filed on Sep. 7, 2017, now Pat. No. 11,285,704.

(51) Int. Cl.
| | |
|---|---|
| *B32B 27/06* | (2006.01) |
| *B05D 1/20* | (2006.01) |
| *B29D 99/00* | (2010.01) |
| *B32B 9/00* | (2006.01) |
| *B32B 18/00* | (2006.01) |
| *B32B 37/14* | (2006.01) |
| *B32B 37/24* | (2006.01) |
| *C01B 32/184* | (2017.01) |
| *C01B 32/194* | (2017.01) |

(52) U.S. Cl.
CPC ................ *B32B 27/06* (2013.01); *B05D 1/20* (2013.01); *B29D 99/005* (2013.01); *B32B 9/007* (2013.01); *B32B 18/00* (2013.01); *B32B 37/14* (2013.01); *C01B 32/184* (2017.08); *C01B 32/194* (2017.08); *B05D 2201/02* (2013.01); *B05D 2401/20* (2013.01); *B32B 2037/246* (2013.01); *B32B 2309/105* (2013.01); *B32B 2313/04* (2013.01); *Y10T 428/30* (2015.01)

(58) Field of Classification Search
CPC .. B05D 2/02; B05D 2201/02; B05D 2401/20; B05D 2037/246; B05D 2313/04
See application file for complete search history.

(56) References Cited

U.S. PATENT DOCUMENTS

| | | | |
|---|---|---|---|
| 2012/0070612 A1* | 3/2012 | Lee ........................ | B82Y 30/00 428/688 |
| 2012/0255899 A1* | 10/2012 | Choi .................... | B01D 53/228 977/734 |
| 2012/0301707 A1* | 11/2012 | Kinloch ................. | B82Y 30/00 977/734 |
| 2018/0342586 A1* | 11/2018 | Kireev .................... | B32B 9/007 |

OTHER PUBLICATIONS

Vlassiouk et al. (ACS Appl Mater Interfaces 2015, 7, 10702-10709) (Year: 2015).*
Narayan et al. (Nano Convergence 2015, 2:20 (Year: 2015).*
Martins et al. PNAS Oct. 29, 2013, vol. 110, No. 44, pp. 17762-17767. (Year: 2013).*

* cited by examiner

*Primary Examiner* — Kelly M Gambetta
(74) *Attorney, Agent, or Firm* — Zilka-Kotab, P.C.

(57) ABSTRACT

A process includes layering a graphene layer onto a polymer layer to form a composite film.

16 Claims, 7 Drawing Sheets

200 ➔

100

102 {
| 106 |
| 104 |

120 {
| 108 |
| 106 |
| 104 |

122 {
| 106 |
| 104 |
| 108 |

110

114

124 {
| 112 |
| 106 |
| 104 |

200

202 Create or acquire a graphene layer

204 Create or acquire a polymer layer

206 Layer a graphene layer onto a polymer layer to form a composite film

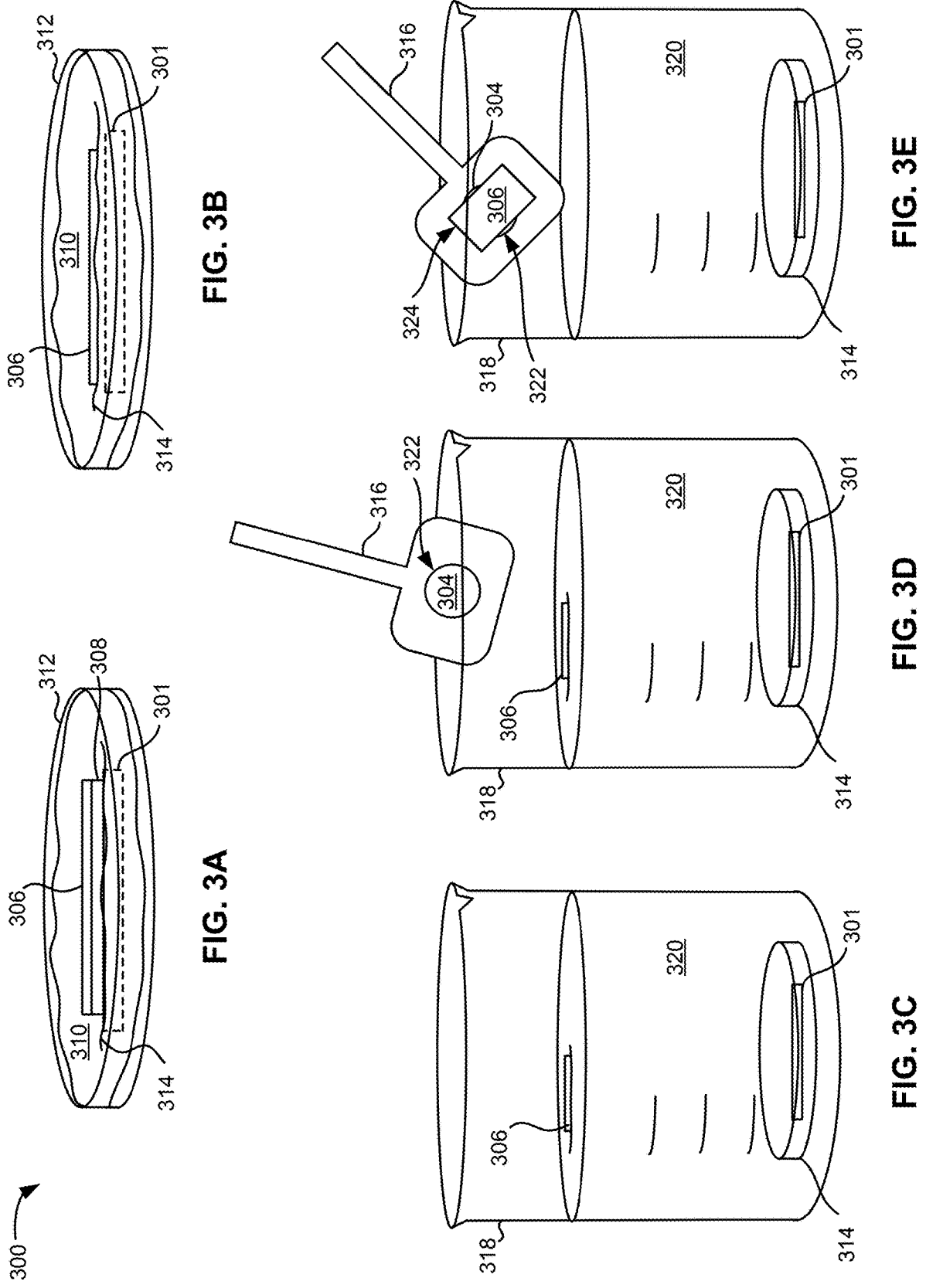

ULTRATHIN GRAPHENE/POLYMER LAMINATE FILMS

This invention was made with Government support under Contract No. DE-AC52-07NA27344 awarded by the United States Department of Energy. The Government has certain rights in the invention.

RELATED APPLICATIONS

This application claims priority to U.S. Nonprovisional patent application Ser. No. 15/698,473 filed Sep. 7, 2017, which is herein incorporated by reference.

FIELD OF THE INVENTION

The present invention relates to polymer laminate films, and more particularly, this invention relates to ultrathin graphene/polymer laminate films and methods of making same.

BACKGROUND

Thin polymer membranes are useful for efficient separations. Typically, permeate diffuses through the polymer material using a very slow and energy intense process. Thinner membranes enable a higher flux at the same energy cost. However, decreasing the thickness of a membrane reduces its stiffness and therefore reduces the amount of pressure that can be applied before membrane failure. Thus, the thickness of the membrane is limited to a minimum value. Moreover, film thickness affects the physical properties of polymer film, for example, glass transition temperature, elastic modulus, yield strain, creep compliance, etc.

Some separation membranes use barrier layers that typically are made of polyamide and are at least 200 nm thick. Some attempts have been made to employ graphene polymer composites, but methods to introduce graphene involve forming a solution of graphene and polymer and then forming a layer from the solution. This method has significant drawbacks: the method limits the graphene content (to typically less than 1%), and also results in fairly thick films, since the alignment of the graphene is not well controlled.

It would be desirable to form an ultra thin composite with distinct layers of graphene and polymer with stiffness capable of withstanding continuous pressure applied during separation processes.

SUMMARY

According to one embodiment, a process includes layering a graphene layer onto a polymer layer to form a composite film.

Other aspects and advantages of the present invention will become apparent from the following detailed description, which, when taken in conjunction with the drawings, illustrate by way of example the principles of the invention.

BRIEF DESCRIPTION OF THE DRAWINGS

FIGS. 3A-3E are schematic drawings of a process of forming ultrathin graphene/polymer film, according to one embodiment.

DETAILED DESCRIPTION

Figure 1A:
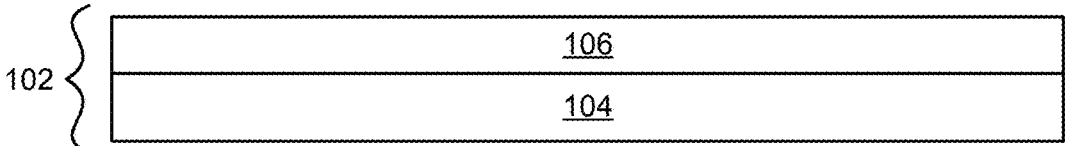
FIGS. 1A-1D are schematic drawings of an ultrathin graphene/polymer film, according to various embodiments.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of ultrathin graphene/polymer laminate films and/or related systems and methods.

In one general embodiment, a product includes a composite film comprising a polymer layer directly adjacent a graphene layer.

In another general embodiment, a process includes layering a graphene layer onto a polymer layer to form a composite film.

A list of acronyms used in the description is provided below.

3D Three dimensional
CVD Chemical vapor deposition
Cu Copper
E Elastic modulus
GPa Gigapascal
MPa Megapascal
Ni Nickel
nm nanometers
NIF National Ignition Facility
Pa Pascals
PEG Polyethylene glycol
PECVD Plasma-enhanced chemical vapor deposition
$S_y$ Yield strength
VE Polyvinyl fomal Various embodiments described herein produce a composite membrane with increased mechanical stiffness while maintaining decreased membrane thickness. Various embodiments describe a process of layering graphene onto a pre-formed polymer thin film. Methods described herein allow for a larger content of graphene and produce a membrane that may be up to 10 times stiffer than the bare polymer.

Various embodiments described herein include a free-standing ultrathin composite film that includes a polymer layer and one or two graphene layers.

FIGS. 1A-1D depict various embodiments of a product 100 comprising an ultrathin composite film. As an option, the present product 100 may be implemented in conjunction with features from any other embodiment listed herein, such as those described with reference to the other FIGS. Of course, however, such product 100 and others presented herein may be used in various applications and/or in permutations which may or may not be specifically described in the illustrative embodiments listed herein. Further, the product 100 presented herein may be used in any desired environment.

According to various embodiments as shown in FIGS. 1A-1D, the product 100 includes a composite film 102 that includes a polymer layer 104 directly adjacent a graphene layer 106.

In some embodiments, the polymer layer 104 has a thickness in a range of greater than zero and less than about 100 nm. In preferred embodiments, the polymer layer 104 has a thickness in a range of 5 nm to 100 nm.

The polymer layer may be formed by any known process. In one approach, the polymer layer 104 may be a polymer spincast from a solution. In other approaches, the polymer layer 104 may be a polymer dropcast from as solution.

In some embodiments, the polymer layer 104 may be a soluble polymer. In some approaches, the polymer layer 104 may be a copolymer of acetal, acetate, and alcohol moieties. In a preferred embodiment, the polymer layer 104 may be poly(vinyl) formal, polystyrene, poly(methylmethacrylate), polyimide, etc. In one embodiment, a free-standing polymer layer may be prepared as using methodology disclosed in U.S. patent application Ser. No. 15/130,524, which is herein incorporated by reference. In some embodiment, a polymer layer 104 may be permeable.

In various embodiments, a polymer layer 104 may be a separation membrane. In one embodiment, the polymer layer 104 may be a membrane with a defined diffusion rate of salt and water. In one embodiment, the polymer layer 104 may have a defined transport rate for salt and water.

In one embodiment, the graphene layer 106 may be a single layer of graphene. In another embodiment, the graphene layer 106 may include several layers of graphene. In a preferred embodiment, a few layers of graphene may be grown on a silicon substrate with a nickel catalyst. In some embodiments, the graphene layer 106 may be permeable.

Additional layers may be present in the product 100 of FIG. 1A, though not shown. Several examples follow.

Figure 1B:
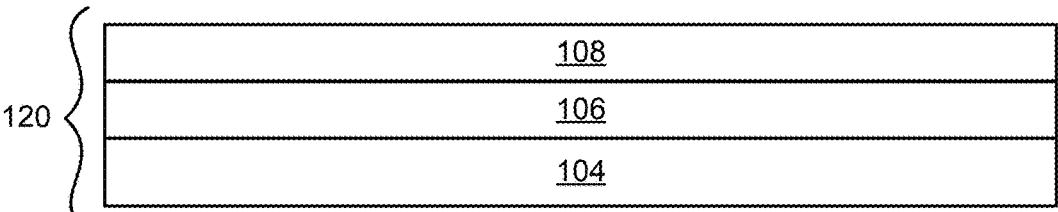

In one approach as shown in FIG. 1B, a composite film 120 may include a second graphene layer 108 directly adjacent the graphene layer 106.

Figure 1C:
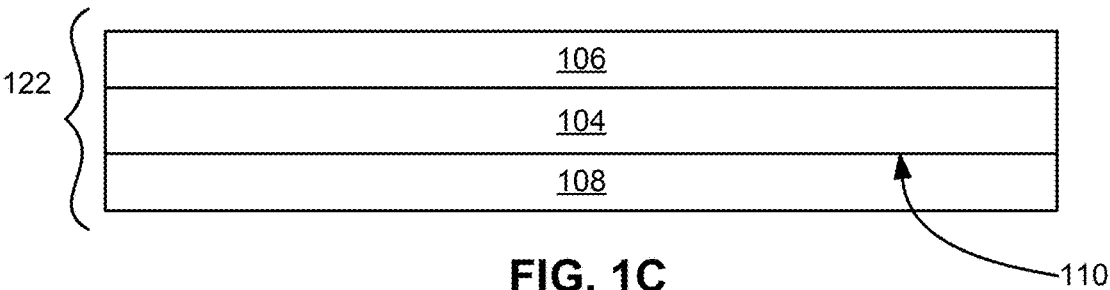

In one approach as shown in FIG. 1C, a composite film 122 may include a second graphene layer 108 directly adjacent a second side 110 of the polymer layer 104, the second side 110 of the polymer layer 104 being on an opposite side of the polymer layer 104 as the graphene layer 106.

Figure 1D:
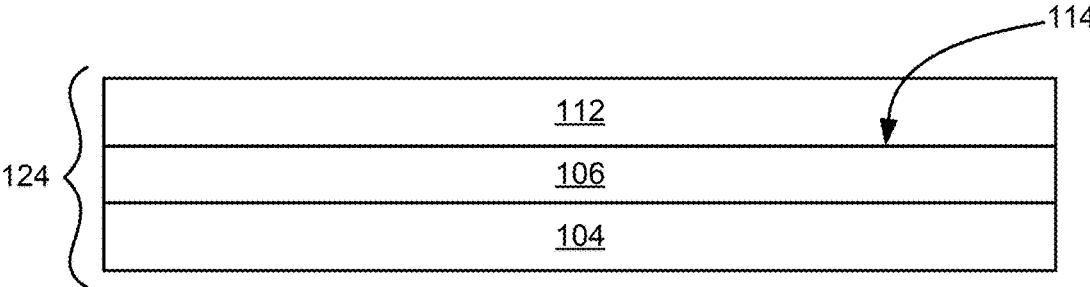

In one approach as shown in FIG. 1D, a composite film 124 may include a second polymer layer 112 directly adjacent a second side 114 of the graphene layer 106, the second side 114 of the graphene layer 106 being on an opposite side of the graphene layer 106 as the polymer layer 104.

In one embodiment, a weight fraction of graphene in the composite film 102 may be greater than 10% relative to the total weight of the polymer layer 104 and graphene layer 106 in the composite film 102. In some approaches, the weight fraction of graphene in the composite film 102 may be greater than 20% relative to the total weight of the polymer layer 104 and graphene layer 106 in the composite film 102.

In some embodiments, the composite film has a stiffness that may be at least twice as stiff as a sum of the stiffnesses of the layers thereof.

In one embodiment, the composite film has a stiffness that may be at least five times a stiffness of the polymer layer.

In one embodiment, the composite film has a yield strength that may be at least two times a yield strength of the polymer layer.

In some approaches, the composite film may be 5 to 8 times stiffer than the polymer film alone and have a yield strength that may be greater than 3 times the yield strength of the polymer film alone. The composite may be stronger than the graphene layer(s) alone, which tend to break when handled in a free-standing form.

Figure 2:
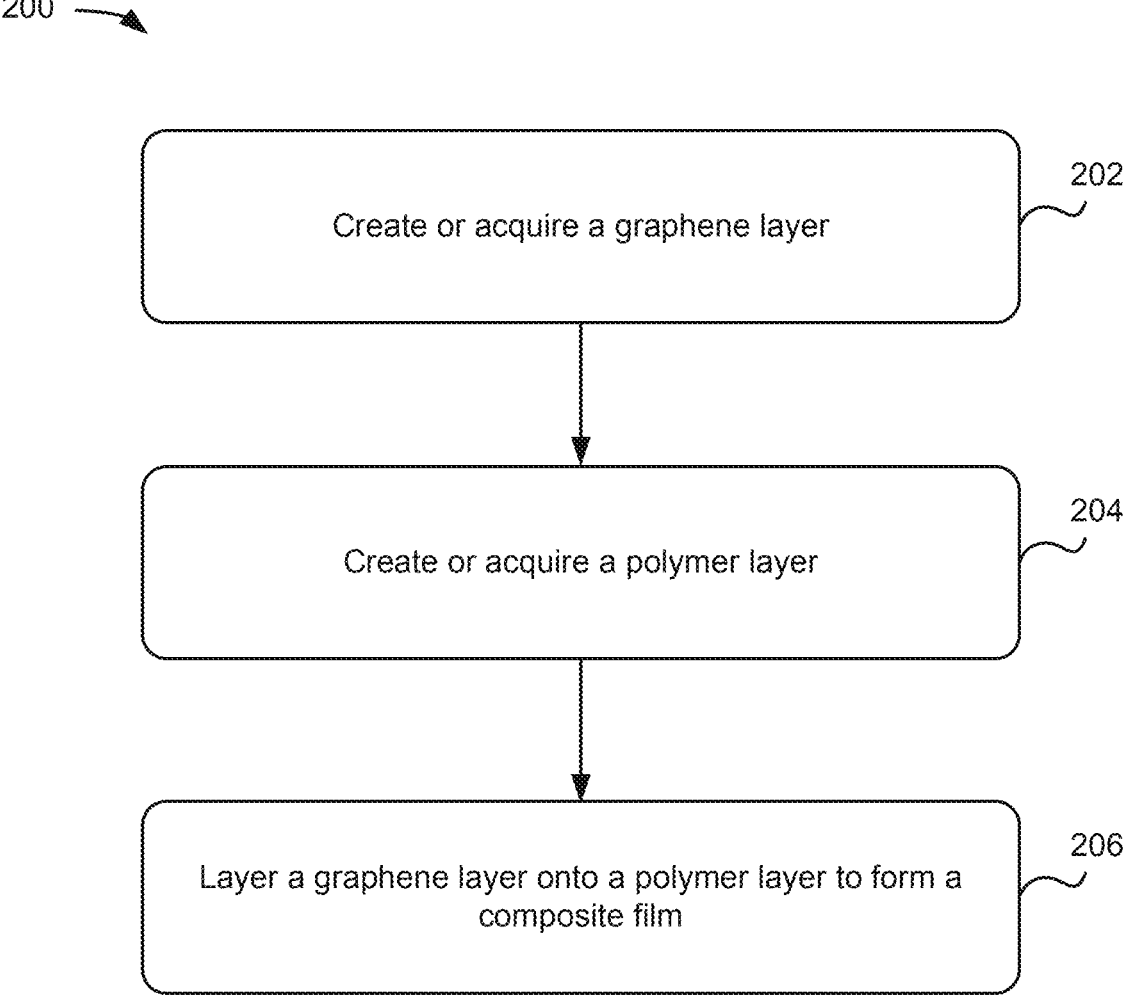
FIG. 2 is a flowchart of a method, according to one embodiment.

FIG. 2 shows a process 200 for forming a composite of polymer and graphene layers, in accordance with one embodiment. As an option, the present process 200 may be implemented to construct structures such as those shown in the other FIGS. described herein. Of course, however, this process 200 and others presented herein may be used to form structures for a wide variety of devices which may or may not be related to the illustrative embodiments listed herein. Further, the processes presented herein may be carried out in any desired environment. Moreover, more or less operations than those shown in FIG. 2 may be included in process 200, according to various embodiments. It should also be noted that any of the aforementioned features may be used in any of the embodiments described in accordance with the various methods and processes.

The process 200 includes an operation 202 of creating or acquiring a graphene layer. Operation 204 includes creating or acquiring a polymer layer. Operation 206 includes layering a graphene layer onto a polymer layer to form a composite film. More details about the various operations are presented below.

In some embodiments, operation 202 includes acquiring a commercially-available graphene layer. In preferred embodiments, the graphene layer is grown. A graphene layer may be grown on a substrate wafer (e.g. silicon wafer) with a metal catalyst. In various approaches, the substrate may be silicon carbide, silicon, silicon/germanium, metal substrates (ruthenium, iridium, nickel, copper, etc.), etc. In various approaches, the method of growing a graphene layer may include thermally-induced catalytic chemical vapor deposition (CVD), plasma-induced chemical vapor deposition (PECVD), etc. In one approach of catalytic CVD, the metal catalyst may be nickel, copper, etc.

In one approach, the graphene layer may be a multilayer of graphene layers, for example, 2, 3, 4, etc. layers thick, each individual layer being one atom thick. In another approach, the graphene layer may be a single layer of graphene.

In one embodiment, the graphene layer may have high mechanical strength due to the carbon covalent bonds creating the graphene. In some approaches, the graphene layer may include islands of graphene that are held together by van der Waals forces, whereby the graphene islands are each mechanically stronger while the film of graphene islands is relatively mechanically weaker.

In one embodiment the graphene layer may be removed from the substrate by immersion of the graphene/substrate in etchant for removing the metal catalyst (e.g. etchant for removing Ni, etchant for removing Cu, etc.). The etchant may be an acid, for example, hydrochloric acid, iron-3-chloride, etc.

In some approaches, the solution of metal etchant may be added to the graphene/substrate wafer/metal catalyst in a container, e.g., a petri dish, so that the solution of etchant forms a meniscus around the graphene layer, but does not submerge the graphene layer. In other approaches, the substrate wafer may be submerged in the solution of etchant.

FIGS. 3A-3E graphically depicts steps in a process 300 for forming a composite of polymer and graphene layers, in accordance with one embodiment. As an option, the present process 300 may be implemented to construct structures such as those shown in the other FIGS. described herein. Of course, however, this process 300 and others presented herein may be used to form structures for a wide variety of devices which may or may not be related to the illustrative embodiments listed herein. Further, the processes presented herein may be carried out in any desired environment. Moreover, more or less operations than those shown in FIG. 3 may be included in process 300, according to various embodiments. It should also be noted that any of the aforementioned features may be used in any of the embodiments described in accordance with the various methods and processes.

The process 300 begins with a graphene film 306 grown on a silicon wafer 301 with a metal catalyst 308 between the graphene film 306 and the silicon wafer 301, as illustrated FIG. 3A. In an exemplary embodiment as shown, a piece of silicon 301 with a nickel catalyst 308 and graphene 306 on top of the silicon 301 may be positioned in a petri dish 312.

A metal etchant 310 (e.g. iron(III) chloride solution) may be added around the silicon 301 piece until the edges are fully covered and the liquid level 314 around the piece of silicon 301 may be higher than the piece of silicon 301. In addition there may be enough surface tension to hold back the liquid level 314 from submerging the piece of silicon 301 with the graphene layer 306 and nickel catalyst 308. The dish 312 may be covered to prevent evaporation.

As shown in FIG. 3B, the solution of metal etchant 310 may dissolve the nickel catalyst 308, thereby allowing the graphene layer 306 to float on the liquid level 314 of the metal etchant 310, e.g. iron chloride solution. The liquid level 314 buoys the graphene layer 306 on top of the solution of etchant 310. The piece of silicon 301 may separate from the graphene layer 306.

After the silicon 301 has separated from the graphene layer 306, the solution of etchant 310 may be removed (e.g. with a pipette), and a solution 320 of solvent, e.g., distilled water may be added. Replacing the metal etchant 310 with distilled water may prevent weakening of the polymer film by the metal etchant 310.

In preferred approaches, the layering of a graphene layer onto a polymer layer to form a composite film may be performed in a neutral solution, for example, the pH of the solution about 7. In some approaches, the pH of the solution may depend on the acid sensitivity of the polymer layer. In some approaches, the solution may have a pH in the basic range (e.g. 7≥pH≥9) for an acid sensitive/base stable polymer. In other approaches, the pH of the solution may have a pH in the acidic range (e.g. 4≥pH≥7) for an acid stable/ base sensitive polymer. In preferred approaches, the solution may be pure water with a neutral pH, e.g. pH is about 7.

As shown in FIG. 3C, the floating graphene layer 306 in the petri dish 312 with the separated silicon 301 wafer of FIG. 3B may be transferred to a larger container 318 containing water solution 320. In some approaches as shown in FIGS. 3D and 3E, the container 318 is large enough when filled with water solution 320 to immerse a holder 316 with the free-standing polymer film 304 into the solution 320 and lift out the graphene layer 306 onto the polymer film 304.

As shown in FIG. 3C, the petri dish 312 and separated silicon 301 may sink to the bottom of the container 318 and the graphene layer 306 may float on the surface of the water solution 320.

Referring back to FIG. 2, operation 204 of process 200 involves creating or acquiring a polymer layer. As shown in FIG. 3D, the polymer layer may be placed on a holder 316. In preferred embodiments, the polymer layer 304 may be created according to methodology disclosed in U.S. patent application Ser. No. 15/130,524, which has been incorporated by reference.

In some embodiments, before the step shown in FIG. 3D, the polymer film 304 may be positioned on the holder 316 by floating a polymer film 304 on the surface of a water solution 320 and lifting out the polymer film 304 from the water solution 320 with a holder 316 (e.g., hoop, spatula, etc.).

Referring back to FIG. 2, operation 206 of the process 200 involves layering a graphene layer onto a polymer layer. FIGS. 3D and 3E illustrate an exemplary embodiment of operation 206 of the process 300 such that a graphene layer 306 may float on the surface of water solution 320 and a polymer layer 304 may lift the graphene layer 306 from the solution 320 during the layering.

As shown in FIG. 3E, the holder 316 may immerse the polymer film 304 that is positioned on the holder 316 into the solution 320 in the container 318. The edges 324 of the floating graphene layer 306 may be approximately matched with the edges 322 of the polymer film 304, if dimensions of the components are similar.

Next, the holder 316 with the polymer film 304 and the graphene layer 306 positioned adjacent (e.g. on top, directly above, etc.) to the polymer film 304 may be slowly withdrawn from the solution 320 in the container 318. In some approaches, the holder 316 with the polymer film 304 may lift the graphene layer 306 out of the solution 320 at an angle in the range of about 100 to about 600 relative to the surface of the solution 320. In preferred approaches, the graphene layer 306 covers the entire polymer film 304, as partially covered polymer films 304 may be susceptible to tearing.

Referring back to FIGS. 1B and 1C, in some embodiments, the process may be repeated thereby including layering a second graphene layer 108 onto the laminate film to create a composite film 120, 122. In some approaches as shown in FIG. 1B, the second graphene layer 108 may be added to the same side as the first graphene layer 106 of the composite film 120. In other approaches as shown in FIG. 1C, the second graphene layer 108 may be added to the polymer layer 104 on the side opposite the first graphene layer 106 of the composite film 122. In some approaches, the process may involve coupling a third graphene layer to the composite film.

In some embodiments of the process as shown in FIG. 1D, the process may involve coupling a second polymer layer 112 to the composite film 124.

In some embodiments, the composite film 102, 120, 122, 124 may be used as a separation medium.

Experiments

Formation of Graphene/Polymer Composite Films

Graphene films (as shown in schematic drawing of FIG. 4A) were prepared by placing a piece of silicon with nickel catalyst and graphene on top into a petri dish and adding iron(III) chloride solution (2 mol/L concentration) around the silicon piece until the edges were fully covered and the liquid level around the piece was higher than the piece (held back by surface tension).

The petri dish was covered to prevent evaporation and allowed to sit at room temperature for 2 to 6 hours, until the iron chloride had dissolved the nickel catalyst, and the graphene floats on top of the liquid (for schematic drawing of method, see FIGS. 3A to 3E).

Figure 4C:
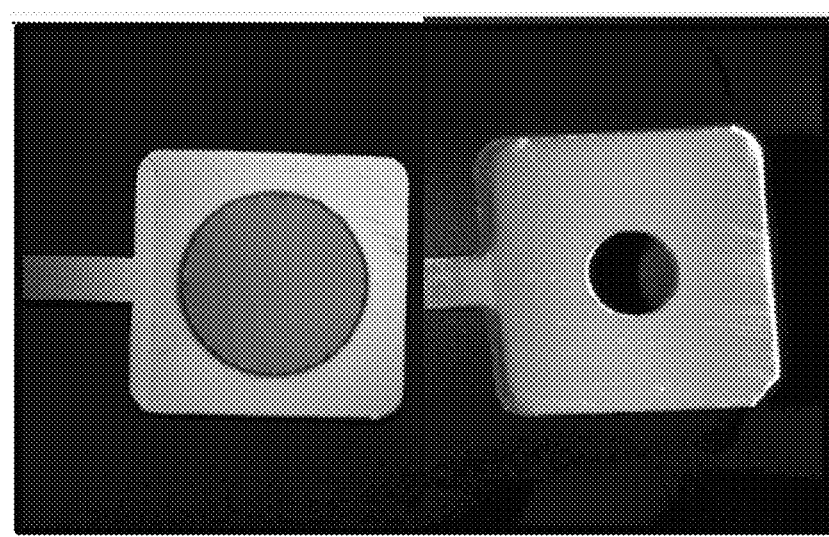
FIG. 4C is a digital image of a holder that lifts the polymer layer and graphene layer out of solution, according to one embodiment.
Figure 4A:
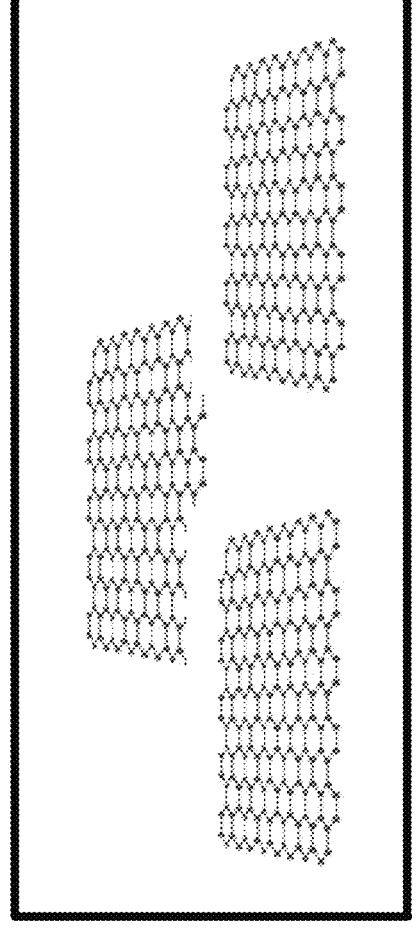
FIG. 4A is a graphic depiction of graphene islands that comprise a graphene layer, according to one embodiment.
Figure 4B:
FIG. 4B is a digital image of polymer layers being lifted out of solution, according to one embodiment.

The iron chloride etchant solution was removed by pipette and distilled water was added to the petri dish. The floating graphene film was transferred to a larger container that could immerse the holder (as shown in FIG. 4C) with the free-standing polymer film (see FIG. 4B) on the holder. A 12 nm thick VE (polyvinyl formal, SPI Supplies, West Chester, PA) free standing polymer film was prepared according to methodology disclosed in U.S. patent application Ser. No. 15/130,524, which has been incorporated by reference.

The polymer film (FIG. 4B) was immersed in into the container with the floating graphene film. The edges of the graphene film were matched with the edges of the polymer film and the polymer film was then slowly withdrawn, lifting the graphene film on top of the polymer film.

Figure 5A:
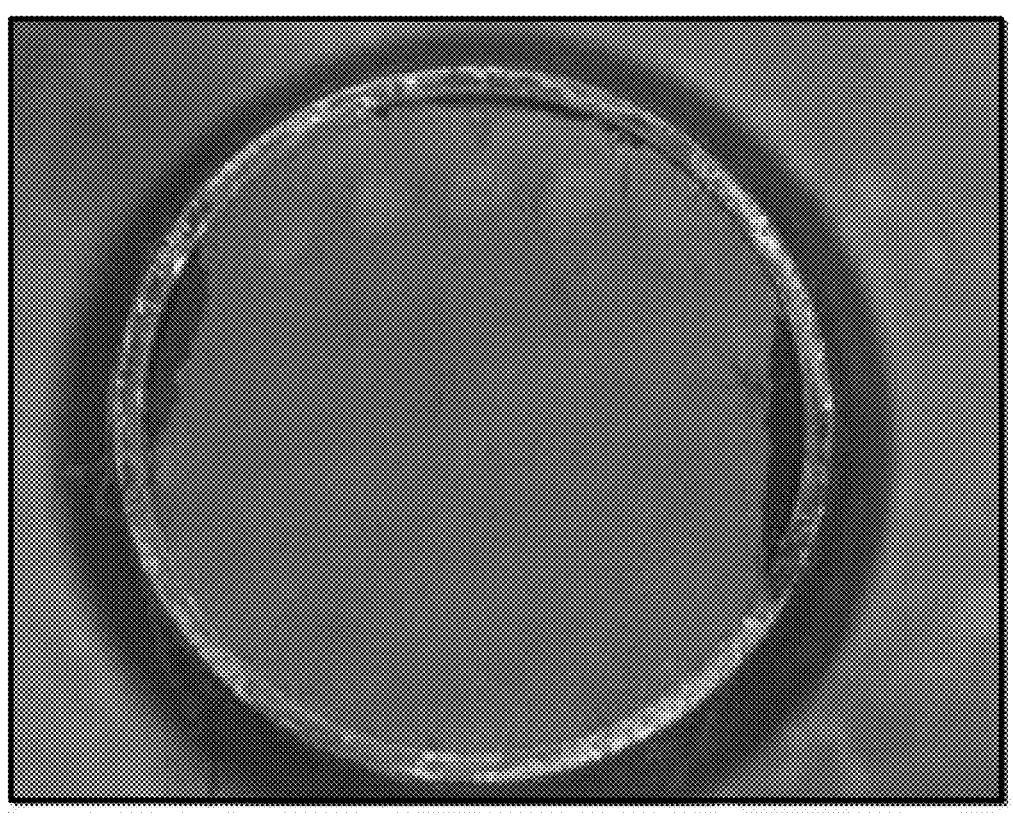
FIG. 5A is a digital image of a composite film of a graphene layer on a polymer layer, according to one embodiment.

FIG. 5A is a digital image of a composite film of polymer film with a few layers of graphene above the film.

Mechanical characterization of the composite film was carried out with Indentation Test using a ball set up in which a spherical ball is pushed into the film (polymer films, composite films), which is mounted on a cylinder. The force that the film exerts on the ball, which is a measure of its stiffness, is recorded with a microbalance.

Figure 5B:
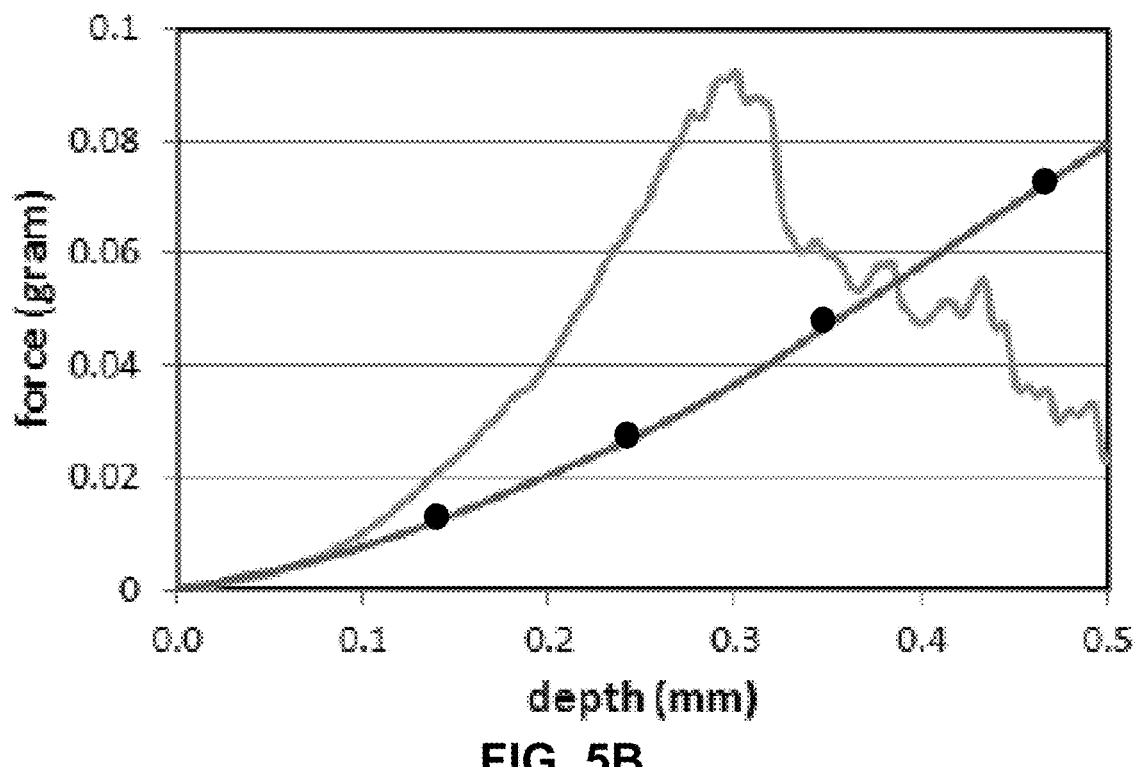
FIG. 5B is a plot of an indentation experiment of a polymer film and a composite film, according to one embodiment.

FIG. 5B depicts a plot of the force exerted on a composite film compared to a polymer film as shown in the Indentation Curve for the VE polymer film (closed circles) and the composite polymer/graphene film (solid line). The polymer film (closed circles) demonstrated a near linear increase in depth of the ball as increased force was applied. The composite film (solid line) demonstrated a significant increase in resistance to indentation (sharp increase in force for indentation distance). The results showed notable stiffness of the composite film compared to the polymer film.

It was surprising that the addition of a very thin graphene layer, characterized by islands of graphene held together with van der Waals forces, and having a thickness about $1/12^{th}$ the thickness of the polymer layer (1 nm graphene/12 nm polymer) imparted an increased stiffness in the composite film (that included one graphene layer and one polymer layer) by a factor between about 3 and 5.

The increased stiffness of the composite film also resulted in decreased failure strain. As shown in FIG. 5B, the composite film (solid line) failed after indentation of a couple of hundred microns compared to the pliable polymer film which failed after indentation in the film reached a few millimeters.

Composite Film with a Thicker Polymer Film

Figure 6B:
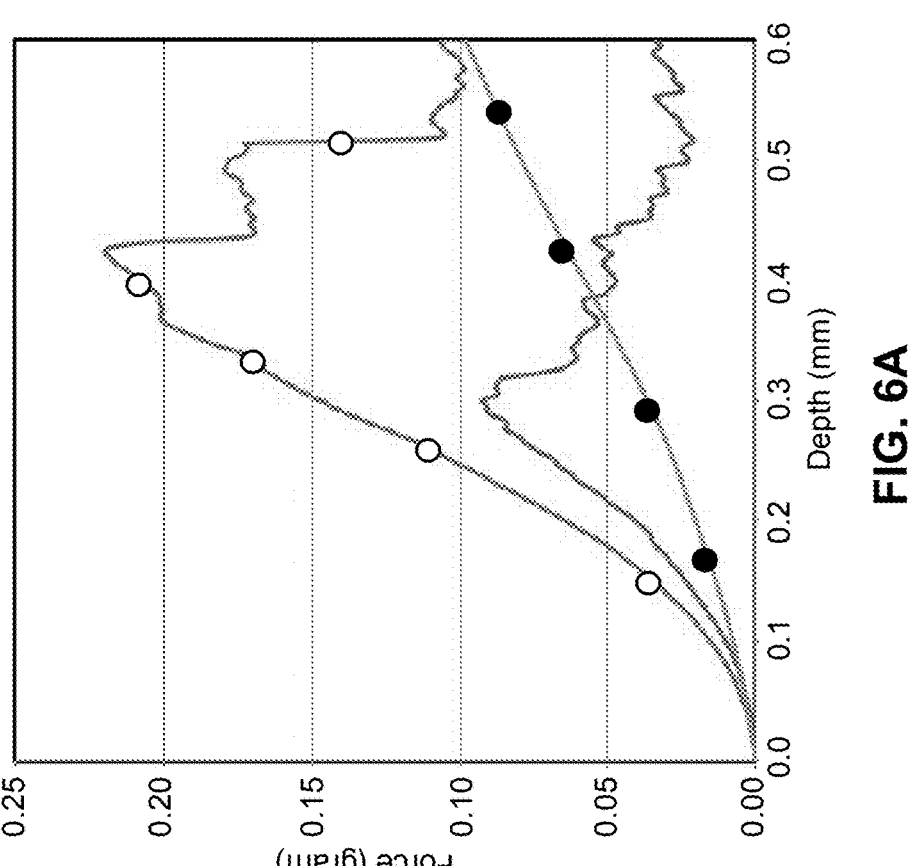
FIG. 6B is a digital image of a composite film of a graphene layer on a thicker polymer, according to one embodiment.
Figure 6A:
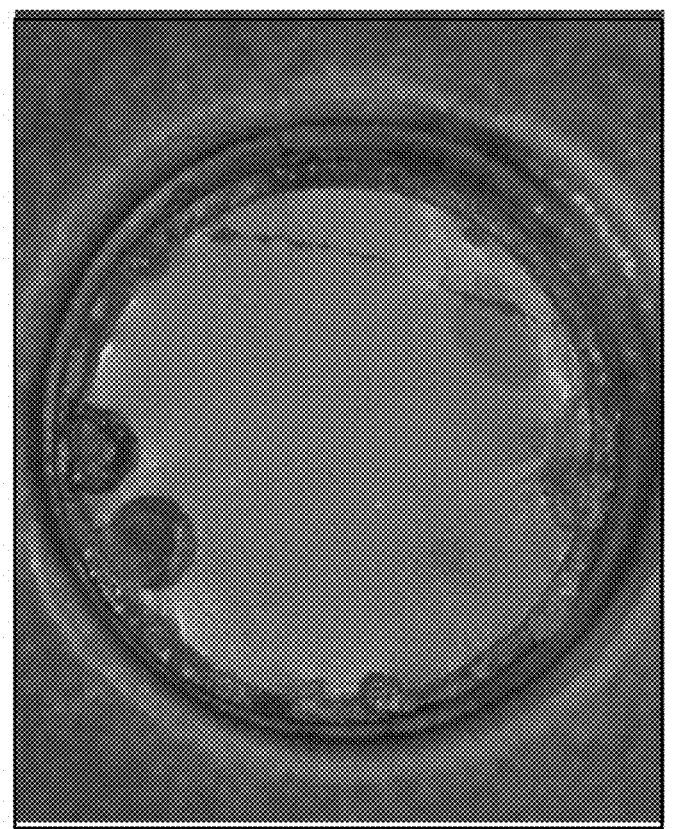
FIG. 6A is a plot of an indentation experiment of a polymer film, a composite film, and a composite film with thicker polymer, according to one embodiment.

FIG. 6A depicts a plot of the force exerted on a composite film formed using thicker VE polymer film with crosslinker, 25 nm VE/PEG+1 nm graphene (open circles) compared to composite film as tested in FIG. 5B (12 nm VE+1 nm graphene (solid line) and polymer film alone (11 nm VE, closed circles). The thicker film with cross linker (open circles) demonstrated stiffer properties compared to the thinner composite film (solid line), thereby needing nearly twice as much force to achieve 0.3 mm of indentation. As before, both composite films demonstrated significant stiffness compared to the polymer film alone (closed circles).

FIG. 6B is a digital image of the composite film of a thicker polymer film with cross-linker with a graphene layer.

Composite Film with Additional Layers of Graphene

Figure 7:
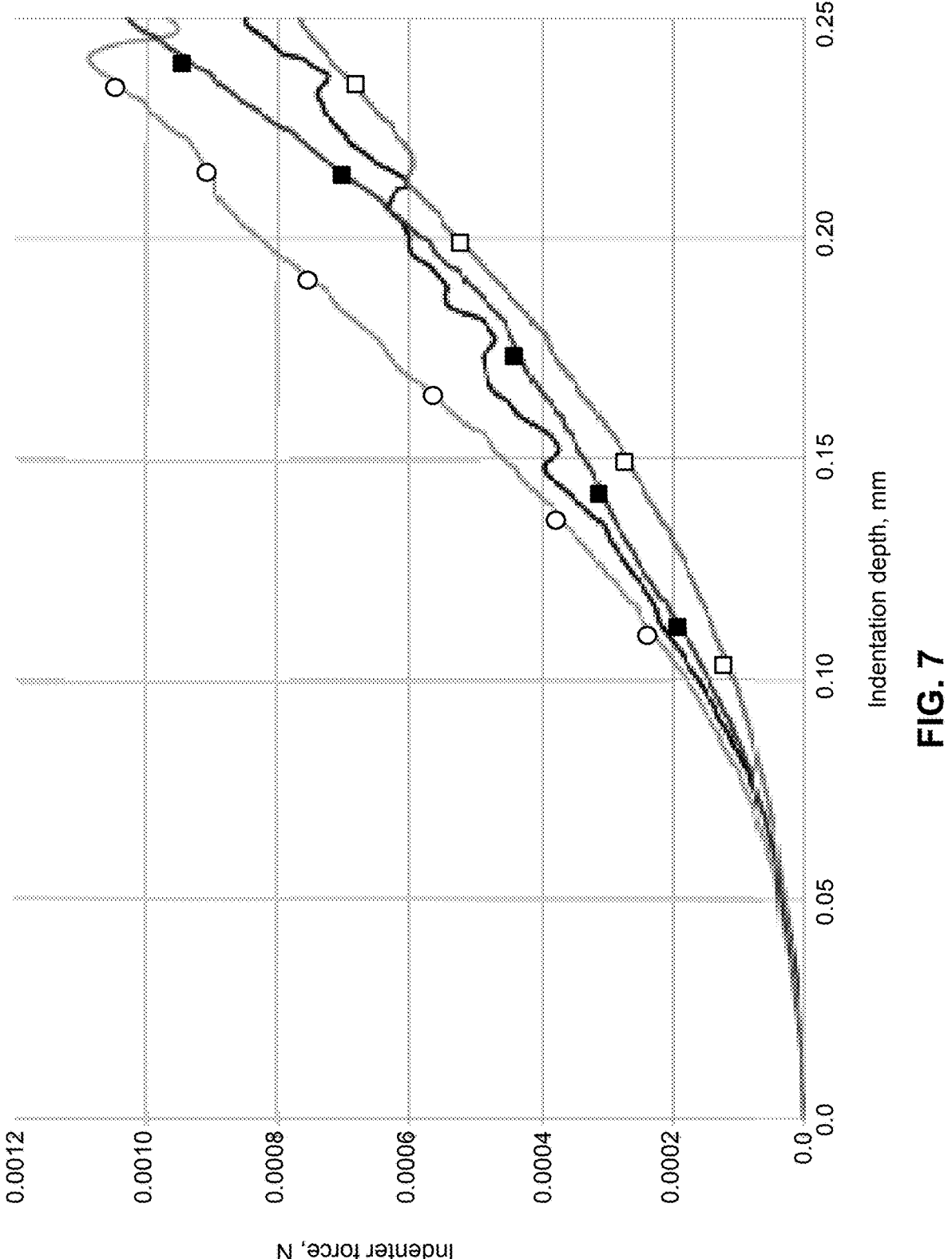
FIG. 7 is a plot of indentation experiment of composite films with one or more layers of graphene, according to one embodiment.

FIG. 7 depicts a plot of the force exerted on composite graphene films in which one and two layers of graphene were added to thick polymer films. The following composite films were compared: 23.5 nm VE/partial graphene (open squares), 23.5 nm VE/one layer graphene (closed circles), 23 nm VE/a layer of graphene on each side of VE polymer film, total two layers of graphene (black line), 23 nm VE/two layers of graphene on the same side of VE polymer film (open circles).

These results showed that elastic response when force was applied (e.g. stiffness) involved greater force for films with more layers of graphene, such that the composite film with only a partial graphene layer (open squares) demonstrated the most elasticity (e.g. the least stiffness) of the four films and the composite film with two layers of graphene on the same side of the polymer film (open circles) had the greatest stiffness of the four films tested. However, the improved stiffness in the films with more graphene was not a linear improvement.

Table 1 below lists the Elastic Modulus (E) and Yield Strength ($S_y$) for the composite films with none, one, or two graphene layers. The $S_y$ value indicates how much force can be applied before the film begins to deform. For the polymer film without graphene (No graphene) a force greater than 47 MPa would start deforming the film. For the composite film with one (1) layer of graphene, a force greater than 115 MPa started deforming the composite film. Thus, the stiffness imparted by the additional graphene layer slowed the deformation changes in the film at forces lower than about 115 MPa.

TABLE 1

| Properties of Multiple Graphene Layer Composites | | |
|---|---|---|
| | E (GPa) | $S_y$ (MPa) |
| No graphene | 2.1 | 47 |
| 1 layer of graphene | 16.2 | 115 |
| 2 layers of graphene | 22.5 | |

In Use

Various embodiment described herein may be useful for separation processes and structural processes requiring ultra-thin material. The films described herein may be used for separations (such as desalination, carbon sequestration, etc.), where the increased stiffness can be used to obtain a membrane that can withstand higher pressures at lower thickness to allow for a higher flux of permeate.

Various embodiments described herein may also be useful for mechanical support, for example in National Ignition Facility (NIF) targets.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A process, comprising:

layering a graphene layer onto a first side of a preexisting polymer layer; and layering a second graphene layer directly onto a second side of the preexisting polymer layer for forming a composite structure consisting of the graphene layer, the second graphene layer, and the preexisting polymer layer.

2. A process, comprising:

layering a graphene layer onto a first side of a polymer layer; and layering a second graphene layer directly onto a second side of the polymer layer for forming a composite structure consisting of the graphene layer, the second graphene layer, and the polymer layer, wherein the layering is performed in a solution.

3. The process of claim 2, wherein the graphene layer floats on the solution, wherein the layering includes causing the polymer layer to lift the graphene layer from the solution.

4. The process of claim 2, wherein the solution has a neutral pH.

5. The process of claim 1, further comprising, layering a third graphene layer onto the graphene layer or the second graphene layer of the composite structure.

6. The process of claim 1, further comprising coupling a third graphene layer to the composite structure.

7. The process of claim 1, further comprising coupling a second polymer layer to the composite structure.

8. The process of claim 1, wherein the graphene layer includes several layers of graphene.

9. The process of claim 1, wherein the graphene layer is a single layer of graphene.

10. The process of claim 1, wherein the graphene layer includes islands of graphene held together by van der Waals forces.

11. The process of claim 1, wherein the graphene layer covers an entire side of the preexisting polymer layer.

12. The process of claim 2, wherein the solution forms a meniscus around the graphene layer.

13. The process of claim 2, wherein the solution includes water.

14. The process of claim 2, wherein the solution is water.

15. The process of claim 1, wherein a method of forming the graphene layer comprises:

forming the graphene layer on a substrate, and separating the graphene layer from the substrate.

16. The process of claim 15, wherein the graphene layer is formed with a metal catalyst, wherein the separating includes adding a metal etchant to the graphene layer on the substrate for separating the graphene layer from the substrate.

* * * * *